(12) United States Patent
Kato et al.

(10) Patent No.: US 8,964,104 B2
(45) Date of Patent: Feb. 24, 2015

(54) IMAGE PICKUP APPARATUS

(75) Inventors: Shingo Kato, Sagamihara (JP); Keigo Matsuo, Akiruno (JP); Hisashi Goto, Suginami-ku (JP)

(73) Assignee: Olympus Corporation, Tokyo (JP)

( * ) Notice: Subject to any disclaimer, the term of this patent is extended or adjusted under 35 U.S.C. 154(b) by 271 days.

(21) Appl. No.: 13/134,627

(22) Filed: Jun. 10, 2011

(65) Prior Publication Data
US 2011/0310291 A1 Dec. 22, 2011

(30) Foreign Application Priority Data
Jun. 17, 2010 (JP) .................................. 2010-138704

(51) Int. Cl.
*H04N 5/232* (2006.01)
*G03B 13/00* (2006.01)
*H04N 5/369* (2011.01)

(52) U.S. Cl.
CPC ......... *H04N 5/23212* (2013.01); *H04N 5/3696* (2013.01)
USPC .......................................... 348/350; 348/354

(58) Field of Classification Search
USPC ................................................. 348/345–357
See application file for complete search history.

(56) References Cited

U.S. PATENT DOCUMENTS

| 7,773,145 | B2 * | 8/2010 | Yamaguchi | 348/345 |
| 2006/0165403 | A1 * | 7/2006 | Ito | 396/123 |
| 2008/0080739 | A1 * | 4/2008 | Muramatsu | 382/103 |
| 2009/0135289 | A1 * | 5/2009 | Kusaka | 348/345 |
| 2010/0066856 | A1 * | 3/2010 | Kishimoto et al. | 348/222.1 |
| 2010/0194967 | A1 * | 8/2010 | Amano | 348/345 |
| 2010/0208127 | A1 * | 8/2010 | Takada et al. | 348/349 |
| 2010/0302433 | A1 * | 12/2010 | Egawa | 348/345 |
| 2010/0309365 | A1 * | 12/2010 | Inoue | 348/345 |

FOREIGN PATENT DOCUMENTS

JP 2009-244429 10/2009

\* cited by examiner

*Primary Examiner* — Christopher K Peterson
(74) *Attorney, Agent, or Firm* — Kenyon & Kenyon LLP

(57) ABSTRACT

An image pickup apparatus of the invention includes: an optical imaging system; an image pickup device; a defocus quantity calculation section for calculating a defocus quantity based on a phase difference between signals for focus detection obtained from pixels for focus detection; a high-frequency component quantity detection section for detecting a quantity of high-frequency component contained in a pixel signal outputted from a pixel other than the pixels for focus detection; a region determination section for determining in accordance with which of the defocus quantity and the high-frequency component quantity the optical imaging system is to be driven, according to a detection result of detecting in which of a plurality of divided blocks of the image pickup device an object of interest is present; and a focusing section for driving the optical imaging system in accordance with a determination result of the region determination section.

22 Claims, 4 Drawing Sheets

TRACKING FRAME

OBJECT OF INTEREST

TRACKING FRAME

OBJECT OF INTEREST

IMAGE PICKUP APPARATUS

CROSS REFERENCE TO RELATED APPLICATION

This application claims benefit of Japanese Application No. 2010-138704 filed in Japan on Jun. 17, 2010, the contents of which are incorporated by this reference.

BACKGROUND OF THE INVENTION

1. Field of the Invention

The present invention relates to an image pickup apparatus, and particularly to an image pickup apparatus having an AF (auto-focusing) function.

2. Description of the Related Art

In image pickup apparatuses such as digital cameras, a technique for performing focus detection according to a pixel signal outputted from an image pickup device has been proposed. Here, focus detection refers to detecting a focus position (focusing condition) of an optical imaging system with respect to an object in an image pickup apparatus. To be specific, there is proposed a focus detection method called a phase-difference detection scheme, in which a pixel group for photographing that receives a light flux that has passed through an optical imaging system and outputs pixel signals and a plurality of pixel groups for focus detection that receive only a light flux that has passed through a different pupil region of the optical imaging system and output pixel signals are respectively provided in an image pickup device, and focus detection is performed according to a phase difference of pixel signals outputted from the plurality of pixel groups for focus detection. Moreover, a focus detection method called a contrast detection scheme has been brought into use in recent years, which performs focus detection according to the magnitude of a high-frequency component quantity contained in the signal component outputted from the above described pixel group for photographing.

For example, Japanese Patent Application Laid-Open Publication No. 2009-244429 discloses a technology of an image pickup apparatus for performing an AF operation for an image pickup region of an image pickup device during live view, in which a contrast AF is performed in accordance with an in-focus position obtained by a contrast detection scheme on the image within an AF frame set in the image pickup region, by utilizing the result of performing a phase difference AF according to the in-focus position obtained by a phase-difference detection scheme and position information of a focus lens provided in the image pickup apparatus.

SUMMARY OF THE INVENTION

An image pickup apparatus of the present invention includes: an optical imaging system for forming an object image; an image pickup device including a plurality of pixels that photoelectrically converts the object image; a defocus quantity calculation section for calculating a defocus quantity based on a phase difference between a plurality of signals for focus detection obtained from a plurality of pixels for focus detection that respectively receive a light flux that passes through a different pupil region of the optical imaging system; a high-frequency component quantity detection section for detecting a quantity of high-frequency component contained in a pixel signal outputted from a pixel other than the plurality of pixels for focus detection; a region determination section for determining in accordance with which of the defocus quantity and the high-frequency component quantity the optical imaging system is to be driven, according to a detection result of detecting in which of a plurality of divided blocks of the image pickup device a region including an object of interest in the object image is present; and a focusing section for driving the optical imaging system in accordance with a determination result of the region determination section so as to achieve an in-focus state.

DETAILED DESCRIPTION OF THE PREFERRED EMBODIMENT

Hereafter, embodiment of the present invention will be described with reference to the drawings.

Figure 1:
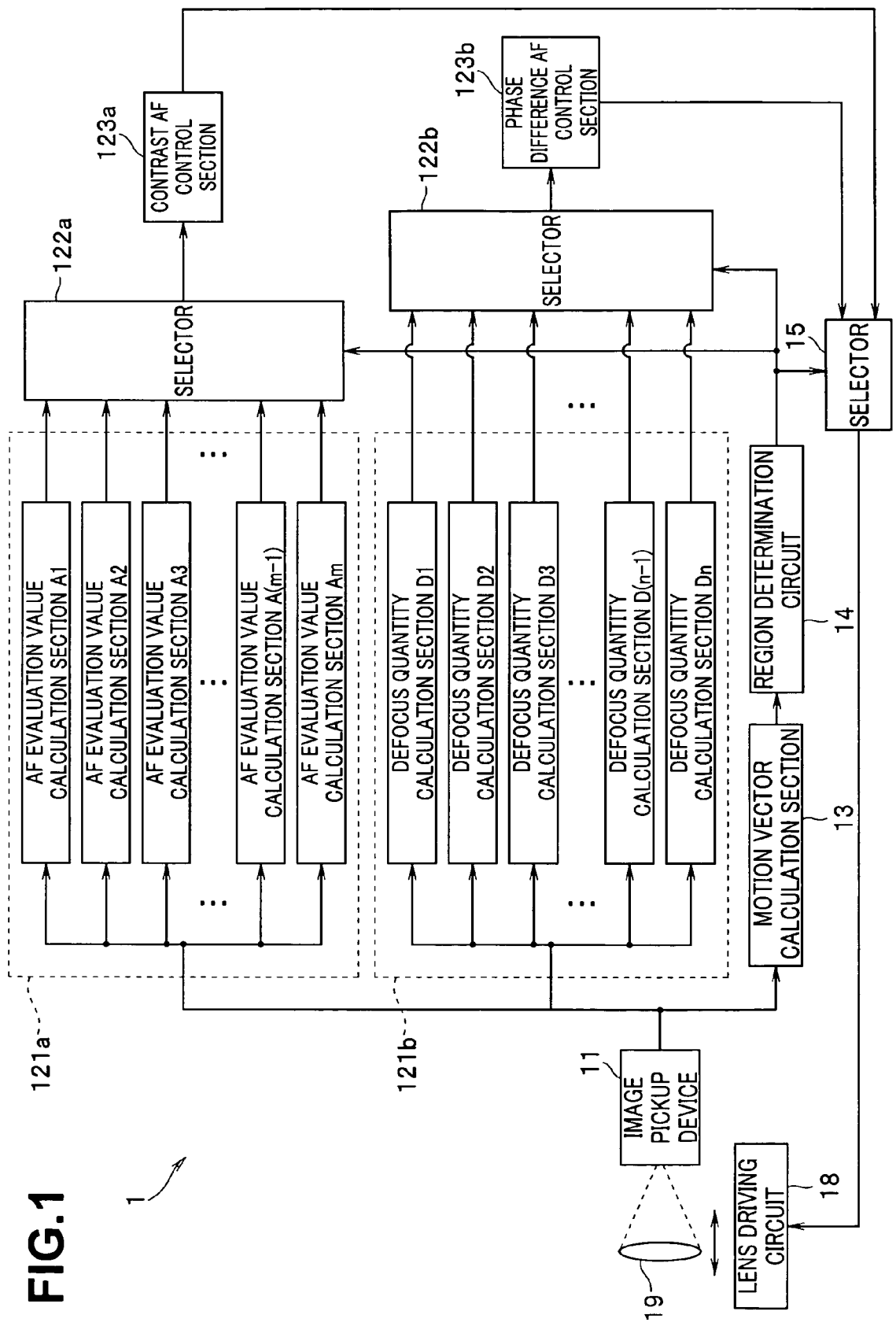
FIG. 1 is a configuration diagram showing a principal part of an image pickup apparatus relating to an embodiment of the present invention.

First, based on FIG. 1, the configuration of an image pickup apparatus relating to the present embodiment will be described. FIG. 1 is a configuration diagram showing the configuration of the image pickup apparatus relating to the present embodiment.

An image pickup apparatus 1 is configured to include an image pickup device 11, an AF evaluation value computing block 121a, a defocus quantity computing block 121b, selectors 122a and 122b, a contrast AF control section 123a, a phase difference AF control section 123b, a motion vector calculation section 13, a region determination circuit 14, a selector 15, a lens driving circuit 18, and an optical imaging system 19 for forming an object image. For example, the image pickup apparatus 1 is a digital camera etc. having an AF function, in which an object image received via the optical imaging system 19, which is an object optical system, is formed on the image pickup device 11, and an image pickup signal from the image pickup device 11 is subjected to image processing by an image processing section not shown so that image data is recorded in a recording medium etc. not shown.

The image pickup device 11 is configured to include pixels for photographing and pixels for focus detection as a plurality of pixels that photoelectrically convert an object image formed by the optical imaging system 19. Moreover, the image pickup device 11 is driven by an image pickup device driving circuit, which is not shown, to output a video signal generated through photoelectric conversion to the AF evaluation value computing block 121a, the defocus quantity computing block 121b, and the motion vector calculation section 13, respectively.

Here, the light from the same point on an object is received as light fluxes from two different pupil regions of the optical imaging system 19 by a plurality of pixel groups for focus detection disposed in the image pickup device 11. Moreover, a plurality of pixel pairs are provided for each pixel group for focus detection. A micro lens or a light shielding mask corresponding to each pixel is provided in the image pickup device 11 such that one pixel of a pixel pair receives a light flux from a pupil region A and the other pixel of the pixel pair receives a light flux form a pupil region B.

Figure 2:
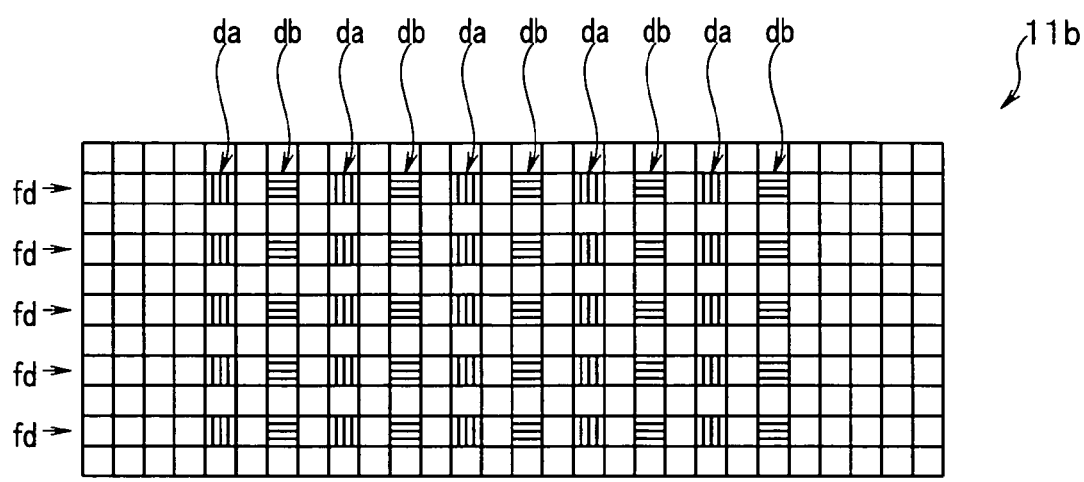
FIG. 2 is a schematic diagram to illustrate the pixel array of a pixel group for focus detection.

FIG. 2 is a schematic diagram to illustrate the pixel array of a pixel group for focus detection provided in an image pickup plane of the image pickup device 11.

A pixel group for focus detection 11b of the present embodiment is configured, for example as shown in FIG. 2, such that 25 pixels da for focus detection with vertical stripes that photoelectrically convert the light flux that has passed through the pupil region A of the optical imaging system 19 and 25 pixels db for focus detection with horizontal stripes that photoelectrically convert the light flux that has passed through the pupil region B of the optical imaging system 19 are discretely disposed, respectively in each divided block made up of 28 horizontal pixels by 11 vertical pixels. In other words, the pixel group for focus detection in the present embodiment is configured, as shown in FIG. 2, such that there are provided five rows fd in each of which five pixels da that photoelectrically convert the light flux that has passed through the pupil region A of the optical imaging system 19 and pixels db that photoelectrically convert the light flux that has passed through the pupil region B of the optical imaging system 19 are discretely provided, respectively. Note that the pixels da and db for focus detection cannot be used as pixels for photographing. Therefore, regarding the pixels at the positions of the pixels da and db for focus detection, image signals for photographing are generated by performing preprocessing to generate interpolated pixels from the surrounding pixels for photographing.

A plurality of pixel groups for focus detection, which each has the pixel array as described above, are discretely provided in an image pickup plane of the image pickup device 11.

Figure 3:
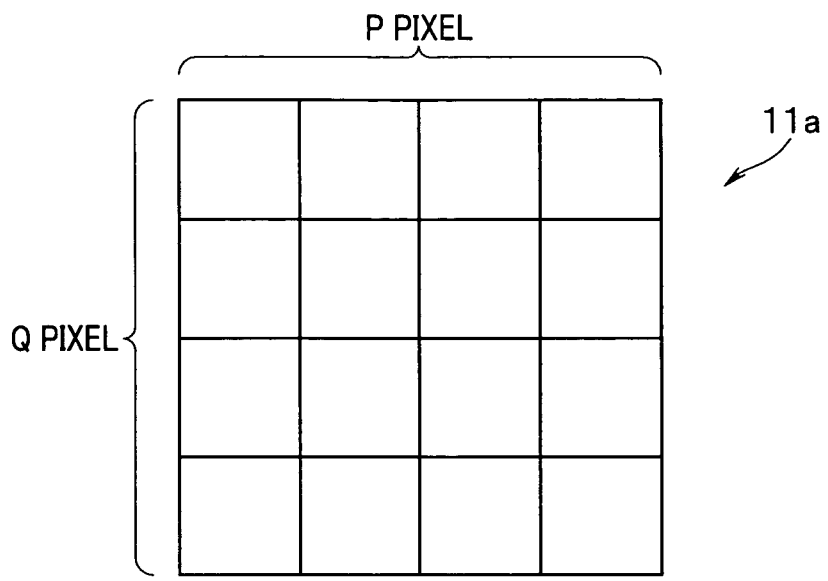
FIG. 3 is a diagram showing an example in which 16 divided blocks are set in an image pickup plane of an image pickup device.

In the present embodiment, as shown in FIG. 3, description will be made on a case in which divided blocks are set by dividing P×Q pixels into 16 divided blocks in the image pickup plane 11a of the image pickup device 11 made up of P×Q pixels disposed in a matrix form. Note that such a divided block is a region which is virtually divided and set in order to process the P×Q pixels in a divided manner. Moreover, it is assumed that a pixel group for focus detection is included in each divided block.

Referring back to FIG. 1, the AF evaluation value computing block 121a is configured to have m number of AF evaluation-value calculation sections A1 to Am which correspond one-to-one to m divided blocks set in a peripheral edge portion of the image pickup plane 11a. Moreover, the defocus quantity computing block 121b is configured to have n number of defocus quantity calculation sections D1 to Dn which correspond one-to-one to n divided blocks set in the middle portion of the image pickup plane 11a. To be specific, for example, setting divided blocks by dividing P×Q number of pixels into 16 divided blocks in the image pickup plane 11a as shown in FIG. 3 will result in m=12 and n=4.

The AF evaluation-value calculation sections A1 to Am are respectively configured so as to be able to detect a high-frequency component quantity contained in the pixel signals outputted from pixels other than the pixels da and db for focus detection in the m number of divided blocks, and extract only the high-frequency quantity obtained from one predetermined divided block to calculate an AF evaluation value. That is, the AF evaluation-value calculation sections A1 to Am are respectively configured to have a function as a high-frequency component quantity detection section.

Accordingly, for example, when 12 divided blocks are set in the peripheral edge portion of the image pickup plane 11a as shown in FIG. 3, 12 AF evaluation values are calculated separately for each divided block by the AF evaluation-value calculation sections A1 to A12.

The defocus quantity calculation sections D1 to Dn are respectively configured to be able to separate pixel signals, which are outputted from the pixels da and db contained in one predetermined divided block, as the pixel signal corresponding to the pupil regions A and B out from each pixel signal outputted from the pixels da and db for focus detection in the n number of divided blocks; and perform correlation computation based on a phase difference in the pixel signals after separation to calculate the defocus quantity by using the computation result of the correlation computation.

For that purpose, for example, when 4 divided blocks are set in the middle portion of the image pickup plane 11a as shown in FIG. 3, 4 defocus quantities are calculated by the defocus quantity calculation sections D1 to D4 separately for each divided block.

The calculation results of the AF evaluation value obtained by the AF evaluation-value calculation sections A1 to Am are outputted to the selector 122a, respectively. Moreover, the calculation results of the defocus quantity obtained by the defocus quantity calculation sections D1 to Dn are outputted to the selector 122b, respectively.

In the meanwhile, the motion vector calculation section 13 performs a template matching processing using pre-acquired template image information based on a video signal outputted from the image pickup device 11 to calculate a motion vector as the vector quantity that indicates to which direction and to which extent the object within the template image has moved between a plurality of frames.

Note that examples of the method of acquiring the above described template image information include the followings.

First, a template image acquisition region is set by a photographer performing a series of operations, that is, first causing a tracking frame for tracking AF to be displayed on a display portion such as a liquid crystal screen etc. of a digital camera, moving the tracking frame such that an object of interest is included in the internal region of the tracking frame, and thereafter half-pressing a release button (or pressing down a tracking frame setting button). Then, an image included in the internal region of the tracking frame can be acquired as template image information by converting image pickup signals, which are read out from the divided block corresponding to the template image acquisition region, into digital signals, and performing image processing on the digital signals.

Moreover, conceivable specific processing contents at the time of calculating the above described motion vector include, for example, the followings.

First, the motion vector calculation section 13 acquires an evaluation value indicating the degree of conformity in color information and luminance value between an image based on video signals, which are read out from divided blocks corresponding to the internal region and the peripheral region of the tracking frame, and pre-acquired template image information. Then, the motion vector calculation section 13 calculates a vector starting from the center coordinates of the tracking frame and ending at the center coordinates of the region in which the above described evaluation value is highest. Further, the position of the tracking frame for tracking AF is updated as needed so as to track the position of the object of interest according to the calculation result of the motion vector.

Figure 4:
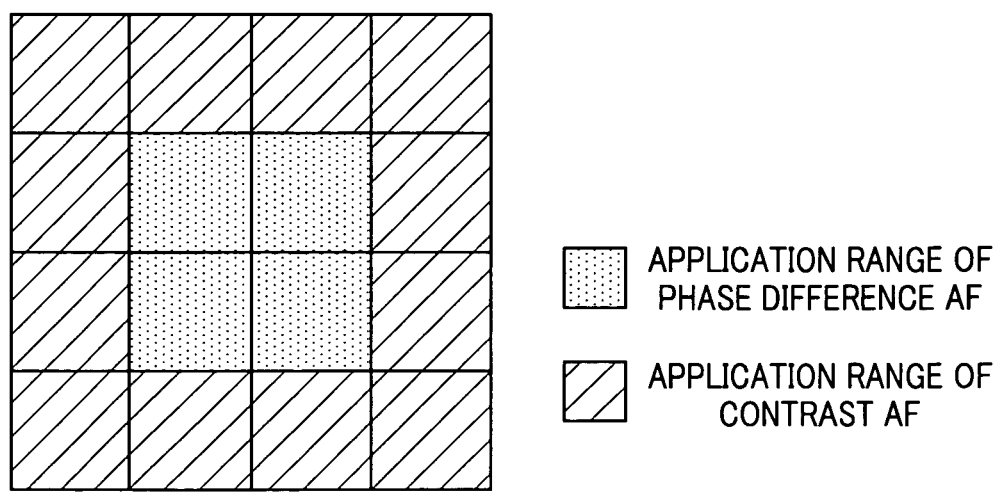
FIG. 4 is a diagram showing an example of the information to be used when deciding which AF scheme of a phase difference AF or a contrast AF schemes is to be selected.

The region determination circuit 14 retains AF scheme selection information as schematically shown in FIG. 4. The AF scheme selection information is used as information for determining which of the AF schemes: the phase difference AF and the contrast AF, is to be selected according to in which of the divided blocks, which have been set in the image pickup plane 11a, the tracking frame is present.

To be specific, the above described AF scheme selection information includes information indicating that the phase difference AF is selected in a divided block in the middle portion of the image pickup plane 11a as a region corresponding to the portion of a dotted pattern of FIG. 4, and the contrast AF is selected in a divided block in the peripheral edge portion of the image pickup plane 11a as a region corresponding to the portion of a hatched pattern of FIG. 4.

The region determination circuit 14 detects the current position of the tracking frame based on the calculation result of the motion vector by the motion vector calculation section 13, and outputs the detection result to the selector 122a and the selector 122b. The selector 122a selects one AF evaluation value in accordance with the detection result outputted from the region determination circuit 14, that is, the AF evaluation value of the divided block corresponding to the current position of the tracking frame out of respective AF evaluation values outputted from the AF evaluation value computing block 121a, and outputs the AF evaluation value to the contrast AF control section 123a. Moreover, the selector 122b selects one defocus quantity in accordance with the detection result outputted from the region determination circuit 14 out of respective defocus quantities outputted from the defocus quantity computing block 121b, that is, the defocus quantity of the divided block corresponding to the current position of the tracking frame, and outputs the one defocus quantity to the phase difference AF control section 123b.

The contrast AF control section 123a performs AF operation by use of so-called a hill-climbing method, based on the AF evaluation value outputted from the selector 122a. More specifically, the contrast AF control section 123a searches for a position of a focus lens of the optical imaging system 19 at which the AF evaluation value outputted from the selector 122a is the maximum. Then, the contrast AF control section 123a generates a driving control signal for achieving an in-focus state of the focus lens by the AF operation and outputs the driving control signal to the selector 15. Moreover, the phase difference AF control section 123b performs AF operation in accordance with the defocus quantity, based on the defocus quantity outputted from the selector 122b. More specifically, the phase difference AF control section 123b calculates how much to move the focus lens of the optical imaging system 19 to a position at which the focus lens is in the in-focus state, that is, calculates a moving amount of the focus lens, based on the defocus quantity outputted from the selector 122b. Then, the phase difference AF control section 123b generates a driving control signal for achieving the in-focus state of the focus lens by the AF operation and outputs the driving control signal to the selector 15.

Figure 5:
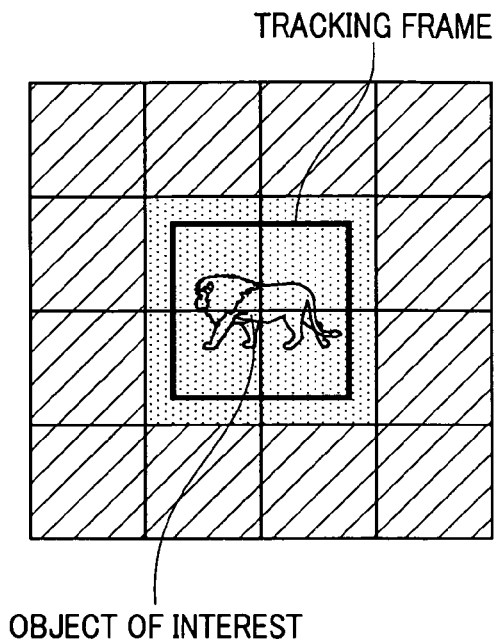
FIG. 5 is a diagram showing an example when the phase difference AF is selected.
Figure 6:
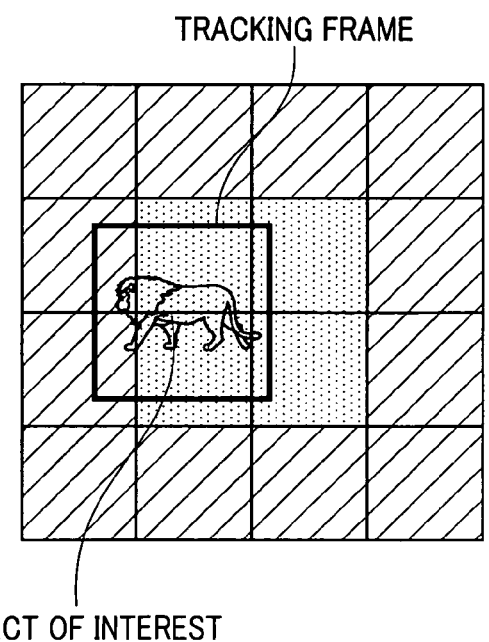
FIG. 6 is a diagram showing an example when the contrast AF is selected.

In the meanwhile, the region determination circuit 14 verifies the detection result of the current position of the tracking frame against the above described AF scheme selection information. Then, the region determination circuit 14 performs the control of the selector 15 such that AF operation in accordance with the phase difference AF is performed, for example, when the entire tracking frame (the tracking frame or the internal region of the tracking frame) is present in the divided block in the middle portion of the image pickup plane 11a as shown in FIG. 5. Moreover, the region determination circuit 14 performs the control of the selector 15 such that AF operation in accordance with the contrast AF is performed, for example, when the tracking frame, or at least part of the internal region of the tracking frame is present in the divided block in the peripheral edge portion of the image pickup plane 11a as shown in FIG. 6.

In other words, the region determination circuit 14 determines according to which of a defocus quantity calculated by the defocus quantity computing block 121b, or a high-frequency component quantity detected by the AF evaluation value computing block 121a the optical imaging system 19 is to be driven, according to the detection result of the current position of the tracking frame.

Note that in a schematically shown divided block as the above described AF scheme selection information, the boundary which serves as the reference in selecting either the phase difference AF or the contrast AF may be preset based on the characteristics of the optical imaging system and the focus detection pixel, or may be set as appropriate by a user.

When AF operation according to the phase difference AF is performed based on the control of the region determination circuit 14, the selector 15 causes the driving control signal outputted from the phase difference AF control section 123b to be outputted to the lens driving circuit 18, and interrupts the driving control signal outputted from the contrast AF control section 123a.

When AF operation according to the contrast AF is performed based on the control of the region determination circuit 14, the selector 15 causes the driving control signal outputted from the contrast AF control section 123a to be outputted to the lens driving circuit 18, and interrupts the driving control signal outputted from the phase difference AF control section 123b.

Then, the phase difference AF function is realized by the lens driving circuit 18 driving the optical imaging system 19 according to the driving signal outputted from the phase difference AF control section 123b via the selector 15. Moreover, the contrast AF function is realized by the lens driving circuit 18 driving the optical imaging system 19 according to the driving control signal outputted from the contrast AF control section 123a via the selector 15. In other words, the lens driving circuit 18 includes a function as a focusing section for driving the optical imaging system 19 according to the determination result of the region determination circuit 14.

Note that the present embodiment may be, without being limited to the above described configuration, configured such that only the pixel signals outputted from the divided block corresponding to the current position of the tracking frame are outputted to the AF evaluation value computing block 121a and the defocus quantity computing block 121b, for example, by gating the pixel signal outputted from each pixel provided in the image pickup plane 11a of the image pickup device 11 according to the control of the region determination circuit 14. According to such configuration, the numbers of the AF evaluation value calculation sections of the AF evaluation value computing block 121a and the defocus quantity calculation sections of the defocus quantity computing block 121b may be one, respectively.

Moreover, the present embodiment may be, without being limited to the above described configuration, configured such that for example, the AF evaluation value computing block 121a includes (m+n) number of AF evaluation-value calculation sections A1 to A(m+n) corresponding one-to-one to (m+n) number of divided blocks that are set in the entire region of the image pickup plane 11a. Thus, causing the region determination circuit 14 and the selector 15 to operate so as to conform to such configuration makes it possible to select one AF scheme, which enables a more suitable in-focus state, out of the phase difference AF and the contrast AF, when the tracking frame is present in a divided block in the middle portion of the image pickup plane 11a.

Further, the present embodiment may be, without being limited to the above described configuration, configured such that for example, a predetermined object such as a human face and a flower is preset in the region determination circuit 14, and the region determination circuit 14 is adapted to detect in which of the divided blocks of the image pickup plane 11a the region including the predetermined object is present. According to such configuration, even if the calculation result of the motion vector by the motion vector calculation section 13 is not obtained, it is possible to apply operation control substantially similar to that described above to the selector 122a, the selector 122b, and the selector 15.

As described so far, according to the present embodiment, the phase difference AF is selected when an object forms an image in the middle portion of the image pickup device, and the contrast AF is selected when an object forms an image in the peripheral edge portion of the image pickup device. Therefore, the present embodiment allows a proper AF operation at any time, even in whichever position of the image pickup device the object forms an image.

Note that the present invention will not be limited to the embodiment described above and may be, without saying, subjected to various alterations and applications within a scope not departing from the spirit of the invention.

What is claimed is:

1. An image pickup apparatus, comprising:
   an optical imaging system for forming an object image;
   a single image pickup device including a plurality of pixels that photoelectrically convert the object image, the plurality of pixels including pixels for photographing and pixels for focus detection;
   a defocus quantity calculation section for calculating a defocus quantity based on a phase difference between a plurality of signals for focus detection obtained from a plurality of pixels for focus detection that respectively receive a light flux that passes through a different pupil region of the optical imaging system;
   a high-frequency component quantity detection section for detecting a quantity of a high-frequency component contained in pixel signals outputted from the pixels for photographing and not from the pixels for focus detection;
   a region determination section for determining in accordance with which of the defocus quantity and the high-frequency component quantity the optical imaging system is to be driven, according to a detection result of detecting in which of a plurality of divided blocks of the image pickup device a region including an object of interest in the object image is present, wherein a position of the object of interest in the object image is detected, and wherein the region determination section uses the detected position to select between the defocus quantity and the high-frequency component quantity; and
   a focusing section for driving the optical imaging system in accordance with a determination result of the region determination section so as to achieve an in-focus state.

2. The image pickup apparatus according to claim 1, wherein
   the region determination section drives the optical imaging system according to the defocus quantity when the region including the object of interest is present in a divided block in a middle portion of the image pickup device, and drives the optical imaging system according to the high-frequency component quantity when the region including the object of interest is present in a divided block in a peripheral edge portion of the image pickup device.

3. The image pickup apparatus according to claim 1, wherein
   the region determination section drives the optical imaging system according to the defocus quantity when an entire region including the object of interest is present in a divided block in a middle portion of the image pickup device, and drives the optical imaging system according to the high-frequency component quantity when at least part of the region including the object of interest is present in a divided block in a peripheral edge portion of the image pickup device.

4. The image pickup apparatus according to claim 1, wherein
   the region including the object of interest is a region set by a tracking frame that tracks a position of the object of interest.

5. The image pickup apparatus according to claim 4, further comprising a motion vector calculation section that calculates a motion vector quantity of the region including the object of interest, wherein
   the tracking frame is updated so as to track the position of the object of interest according to the motion vector quantity.

6. The image pickup apparatus according to claim 1, wherein
   the object of interest is a predetermined object that is set in advance.

7. The image pickup apparatus according to claim 1, wherein
   the divided blocks include a first region and a second region, and
   the region determination section determines that the optical imaging system is to be driven according to the defocus quantity in response to detecting that the region including the object of interest is present in the first region, and determines that the optical imaging system is to be driven according to the high-frequency component quantity in response to detecting that the region including the object of interest is present in the second region.

8. The image pickup apparatus according to claim 7, wherein a boundary between the first region and the second region is preset based on characteristics of the optical imaging system and the pixels for focus detection.

9. The image pickup apparatus according to claim 1, wherein
   the divided blocks include a first region and a second region, and
   the region determination section determines that the optical imaging system is to be driven according to the defocus quantity in response to detecting that an entire region including the object of interest is present in the first region, and determines that the optical imaging system is to be driven according to the high-frequency component quantity in response to detecting that the region including the object of interest is present in at least part of the second region.

10. The image pickup apparatus according to claim 9, wherein a boundary between the first region and the second region is preset based on characteristics of the optical imaging system and the pixels for focus detection.

11. An image pickup apparatus, comprising:
    an optical imaging system for forming an object image;

a single image pickup device including a plurality of pixels that photoelectrically convert the object image, the plurality of pixels including pixels for photographing and pixels for focus detection;

a defocus quantity calculation section for calculating a defocus quantity based on a phase difference between a plurality of signals for focus detection obtained from a plurality of pixels for focus detection that respectively receive a light flux that passes through a different pupil region of the optical imaging system;

a high-frequency component quantity detection section for detecting a quantity of a high-frequency component contained in pixel signals outputted from the pixels for photographing and not from the pixels for focus detection;

a region determination section for determining in accordance with which of the defocus quantity and the high-frequency component quantity the optical imaging system is to be driven, according to a detection result of detecting in which of a plurality of divided blocks of the image pickup device a region including an object of interest in the object image is present, wherein a position of the object of interest in the object image is detected based on user specified information concerning the object of interest, and wherein the region determination section uses the detected position to select between the defocus quantity and the high-frequency component quantity; and a focusing section for driving the optical imaging system in accordance with a determination result of the region determination section so as to achieve an in-focus state.

12. The image pickup apparatus according to claim 11, wherein the region determination section drives the optical imaging system according to the defocus quantity when the region including the object of interest is present in a divided block in a middle portion of the image pickup device, and drives the optical imaging system according to the high-frequency component quantity when the region including the object of interest is present in a divided block in a peripheral edge portion of the image pickup device.

13. The image pickup apparatus according to claim 11, wherein the region determination section drives the optical imaging system according to the defocus quantity when an entire region including the object of interest is present in a divided block in a middle portion of the image pickup device, and drives the optical imaging system according to the high-frequency component quantity when at least part of the region including the object of interest is present in a divided block in a peripheral edge portion of the image pickup device.

14. The image pickup apparatus according to claim 11, wherein the region including the object of interest is a region set by a tracking frame that tracks a position of the object of interest.

15. The image pickup apparatus according to claim 14, further comprising a motion vector calculation section that calculates a motion vector quantity of the region including the object of interest, wherein the tracking frame is updated so as to track the position of the object of interest according to the motion vector quantity.

16. The image pickup apparatus according to claim 11, wherein the object of interest is a predetermined object that is set in advance.

17. The image pickup apparatus according to claim 11, wherein the divided blocks include a first region and a second region, and the region determination section determines that the optical imaging system is to be driven according to the defocus quantity in response to detecting that the region including the object of interest is present in the first region, and determines that the optical imaging system is to be driven according to the high-frequency component quantity in response to detecting that the region including the object of interest is present in the second region.

18. The image pickup apparatus according to claim 17, wherein a boundary between the first region and the second region is preset based on characteristics of the optical imaging system and the pixels for focus detection.

19. The image pickup apparatus according to claim 11, wherein the divided blocks include a first region and a second region, and the region determination section determines that the optical imaging system is to be driven according to the defocus quantity in response to detecting that an entire region including the object of interest is present in the first region, and determines that the optical imaging system is to be driven according to the high-frequency component quantity in response to detecting that the region including the object of interest is present in at least part of the second region.

20. The image pickup apparatus according to claim 19, wherein a boundary between the first region and the second region is preset based on characteristics of the optical imaging system and the pixels for focus detection.

21. The image pickup apparatus of claim 11, wherein the user specified information includes a position of the object of interest in a previous image.

22. The image pickup apparatus of claim 21, wherein the image pickup apparatus:

stores a template image corresponding to the object of interest in the previous image; and detects the position of the object of interest in the object image by matching the template image.

* * * * *